(12) United States Patent
Jung et al.

(10) Patent No.: US 8,320,314 B2
(45) Date of Patent: Nov. 27, 2012

(54) METHOD FOR EFFICIENTLY PERFORMING INITIAL ACCESS IN A MULTI-CARRIER BROADBAND WIRELESS ACCESS SYSTEM

(75) Inventors: In Uk Jung, Gyeonggi-do (KR); Ki Seon Ryu, Gyeonggi-do (KR); Jeong Ki Kim, Gyeonggi-do (KR); Hee Jeong Cho, Gyeonggi-do (KR); Yong Ho Kim, Gyeonggi-do (KR); Young Soo Yuk, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 12/639,923

(22) Filed: Dec. 16, 2009

(65) Prior Publication Data

US 2010/0157923 A1    Jun. 24, 2010

Related U.S. Application Data

(60) Provisional application No. 61/122,743, filed on Dec. 16, 2008.

(51) Int. Cl.
*H04W 4/00*    (2009.01)

(52) U.S. Cl. .......................... 370/329; 370/342; 370/482
(58) Field of Classification Search .......... 370/329–338, 370/350, 342, 482–497
See application file for complete search history.

(56) References Cited

U.S. PATENT DOCUMENTS

| | | | |
|---|---|---|---|
| 2003/0076812 A1* | 4/2003 | Benedittis | 370/350 |
| 2006/0018279 A1* | 1/2006 | Agrawal et al. | 370/330 |
| 2012/0026958 A1* | 2/2012 | Chou | 370/329 |

* cited by examiner

*Primary Examiner* — Ricky Ngo
*Assistant Examiner* — Iqbal Zaidi
(74) *Attorney, Agent, or Firm* — Lee, Hong, Degerman, Kang & Waimey

(57) ABSTRACT

A method for efficiently performing an initial access in an MS in a multi-carrier broadband wireless access system is disclosed. The method includes scanning a plurality of carriers supported by a BS, and selecting one of the scanned carriers as a first carrier and receiving an SFH of the first carrier. The SFH of the first carrier includes at least one of a field indicating load status of the first carrier and recommended network entry carrier information including information about a second carrier in good load status.

9 Claims, 7 Drawing Sheets

(a)

(b)

METHOD FOR EFFICIENTLY PERFORMING INITIAL ACCESS IN A MULTI-CARRIER BROADBAND WIRELESS ACCESS SYSTEM

This application claims the benefit of U.S. Provisional Application Ser. Nos. 61/122,743, filed on Dec. 16, 2008, which is hereby incorporated by reference as if fully set forth.

BACKGROUND OF THE INVENTION

1. Field of the Invention

The present invention relates to a wireless communication system, and more particularly, to a method for efficiently performing initial access in a multi-carrier broadband wireless access system.

2. Discussion of the Related Art

An Advanced Mobile Station (AMS) and an Advanced Base Station (ABS) communicate with each other on a plurality of carriers in compliance with the Institute of Electrical and Electronics Engineers (IEEE) 802.16m standard, more efficiently than in a single-carrier environment. For example, from the viewpoint of the AMS, it can use a wider bandwidth, whereas from the viewpoint of the ABS, it can accommodate more users. Besides IEEE 802.16m, other radio technologies (e.g. Long Term Evolution-Advanced (LTE-A) support the multi-carrier communication.

A conventional multi-carrier wireless communication system will be described below.

FIG. 1 illustrates examples of using multiple carriers in a conventional wireless communication system.

Generally, contiguous multiple carriers may be aggregated as illustrated in FIG. 1(a) or non-contiguous multiple carriers may be aggregated as illustrated in FIG. 1(b). A carrier aggregation unit is a basic bandwidth unit in a legacy system (e.g. LTE is a legacy system for LTE-A and IEEE 802.16e is a legacy system for IEEE 802.16m). In a multi-carrier environment, two types of carriers are typically defined, primary carrier and secondary carrier.

The primary carrier is the carrier used by the ABS and the AMS to exchange traffic and full PHYsical (PHY)/Medium Access Control (MAC) control information. Further, the primary carrier may be used for a general AMS operation such as network entry. Each AMS has a single carrier that it considers to be its primary carrier for initial network entry to a cell.

The secondary carrier is an additional carrier that can be used for exchanging traffic according to the ABS's specific allocation commands and rules, typically received on the primary carrier.

Based on the usage of the primary and/or secondary carrier, the carriers of the multi-carrier system may be classified differently as follows, from the perspective of the ABS.

Fully configured carrier: A carrier for which all control channels including synchronization, broadcast, multicast and unicast control channels are configured. Information and parameters regarding a multi-carrier operation and the other carriers may also be included in the control channels.

Partially configured carrier: A carrier with only an essential control channel configuration to support traffic exchanges in the multi-carrier environment, that is, a carrier on which only downlink data is transmitted and received.

Preferably, the primary carrier is fully configured, whereas the secondary carrier is fully or partially configured depending on channel status and user requirements. When one of fully configured carriers available to a cell is allocated as a primary carrier to an AMS in the cell, the AMS may be controlled through the primary carrier. In addition, the AMS may dynamically use a plurality of secondary carriers. In general, the AMS receives information about a secondary carrier as well as typical control information on the primary carrier, and transmits and receives data on the secondary carrier or primary carrier. A fully configured carrier allocated as a secondary carrier to an AMS may be a primary carrier for another AMS.

The IEEE 802.16m standard regulates that an AMS enters an ABS in accordance with a conventional IEEE 802.16e procedure. Specifically, the AMS synchronizes to the ABS by contention-based Code Division Multiple Access (CDMA) code ranging, and then performs a network entry procedure by exchanging an Advanced Air Interface Ranging Request (RNG-REQ) message and a Ranging Response (AAI_RNG-RSP) message with the ABS. Subsequently, the AMS and the ABS may perform a capability negotiation procedure.

FIG. 2 is a flowchart illustrating an initial access method in the conventional wireless communication system and FIG. 3 is a diagram illustrating a signal flow for a ranging procedure between an AMS and an ABS in the conventional wireless communication system.

Referring to FIG. 2, upon power-on, the AMS searches for an ABS to serve by scanning DownLink (DL) channels. Without initial knowledge of the geography and configuration of a network, the AMS scans the frequencies of neighbor ABSs one by one.

After completing every system setting by acquiring Downlink (DL) and UpLink (UL) system information about the detected ABS, the AMS performs a ranging procedure with the ABS, as illustrated in FIG. 3. The AMS acquires UL synchronization by contention-based ranging with the ABS using a CDMA ranging code.

Until the synchronization is completed, the ABS notifies the AMS of parameters to be adjusted by an RNG-RSP message. The status of the RNG-RSP message is set to "continue" during the parameter adjustment, and when the parameter adjustment is completed, the ABS transmits an RNG-RSP message with a status set to "success" to the AMS. When the AMS is fully synchronized to the ABS, it registers to a broadband network and receives services over the broadband network.

If an initial access is performed in the above conventional method in a multi-carrier environment, the AMS should select one of a plurality of carriers supported by the ABS, for the initial access. However, the AMS's access to a specific carrier may be rejected depending on the load statuses of the carriers of the ABS. Then the ABS attempts an access to another carrier, thus causing an unnecessary delay. Accordingly, there exists a need for a method for efficiently performing an initial access in the AMS, taking into account the load statuses of a plurality of carriers supported by the ABS under the multi-carrier environment.

SUMMARY OF THE INVENTION

Accordingly, the present invention is directed to a method for performing an initial access in a multi-carrier broadband wireless access system that substantially obviates one or more problems due to limitations and disadvantages of the related art.

An object of the present invention is to provide a method for efficiently performing an initial access in a Mobile Station (MS) in a multi-carrier environment.

Another object of the present invention is to provide a method for transmitting information about the load statuses of multiple carriers supported by a Base Station (BS) to an MS.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for efficiently performing an initial access in an MS in a multi-carrier broadband wireless access system includes scanning a plurality of carriers supported by a BS, and selecting one of the scanned carriers as a first carrier and receiving a Super Frame Header (SFH) of the first carrier.

The SFH of the first carrier may include at least one of a field indicating load status of the first carrier and recommended network entry carrier information including information about a second carrier in good load status.

The method may further include determining whether the first carrier is a fully configured carrier, and determining the load status of the first carrier based on the field, if the first carrier is a fully configured carrier.

If the field indicates that the first carrier is in good load status, the method may further include performing the initial access on the first carrier.

If the field indicates that the first carrier is in bad load status, the method may further include scanning the second carrier about which the information is included in the recommended network entry carrier information, receiving an SFH of the second carrier, and performing the initial access on the second carrier.

The initial access may be performed on the second carrier, only if a field indicating load status of the second carrier in the SFH of the second carrier indicates that the second carrier is in good load status.

The field may be a cell bar bit field.

The recommended network entry carrier information may include information about at least one of an index, center frequency offset, and bandwidth of the second carrier and may be included as a secondary SFH subpacket information element in the SFH.

The recommended network entry carrier information may be updated at every predetermined interval.

In another aspect of the present invention, an MS in a multi-carrier broadband wireless access system includes a processor, and a Radio Frequency (RF) module for transmitting and receiving RF signals under control of the processor.

The processor may select one of a plurality of carriers supported by a BS, receive an SFH of the selected carrier, the SFH of the selected carrier including at least one of a field indicating load status of the selected carrier and recommended network entry carrier information indicating a recommended carrier in good load status among the plurality of carriers, and select a carrier on which an initial access is to be performed using the field and the recommended network entry carrier information.

The processor may determine whether the selected carrier is a fully configured carrier and determine the load status of the selected carrier based on the field, if the selected carrier is a fully configured carrier.

If the field indicates that the selected carrier is in good load status, the processor may perform the initial access on the first carrier.

If the field indicates that the selected carrier is in bad load status, the processor may perform the initial access on the recommended carrier.

If the field indicates that the selected carrier is in bad load status, the processor may scan the recommended carrier by controlling the RF module and perform the initial access on the recommended carrier.

The processor may control the RF module to receive an SFH of the recommended carrier and perform the initial access on the recommended carrier, only if a field indicating load status of the recommended carrier in the SFH of the recommended carrier indicates that the recommended carrier is in good load status.

The field may be a cell bar bit field.

The recommended network entry carrier information may include information about at least one of an index, center frequency offset, and bandwidth of the recommended carrier and may be included as a secondary SFH subpacket information element in the SFH.

Accordingly, the present invention provides the following effects and/or advantages.

First of all, an AMS (or MS) can efficiently perform an initial access in a multi-carrier environment.

Secondly, the AMS can acquire information about the load statuses of carriers supported by an ABS (or BS).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
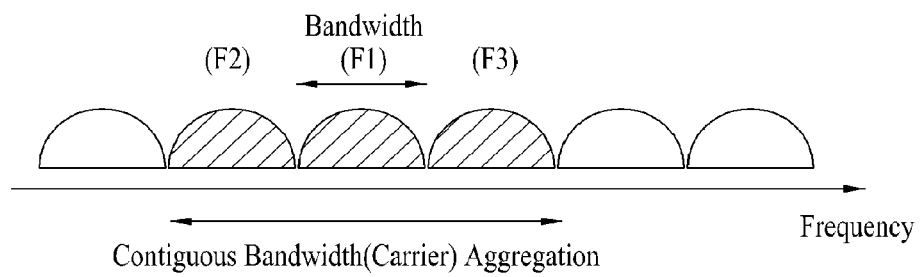
FIG. 1 illustrates examples of using multiple carriers in a conventional wireless communication system.
Figure 1:
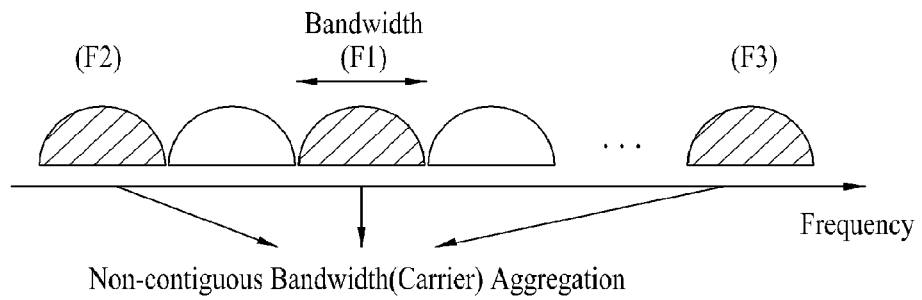
Figure 2:
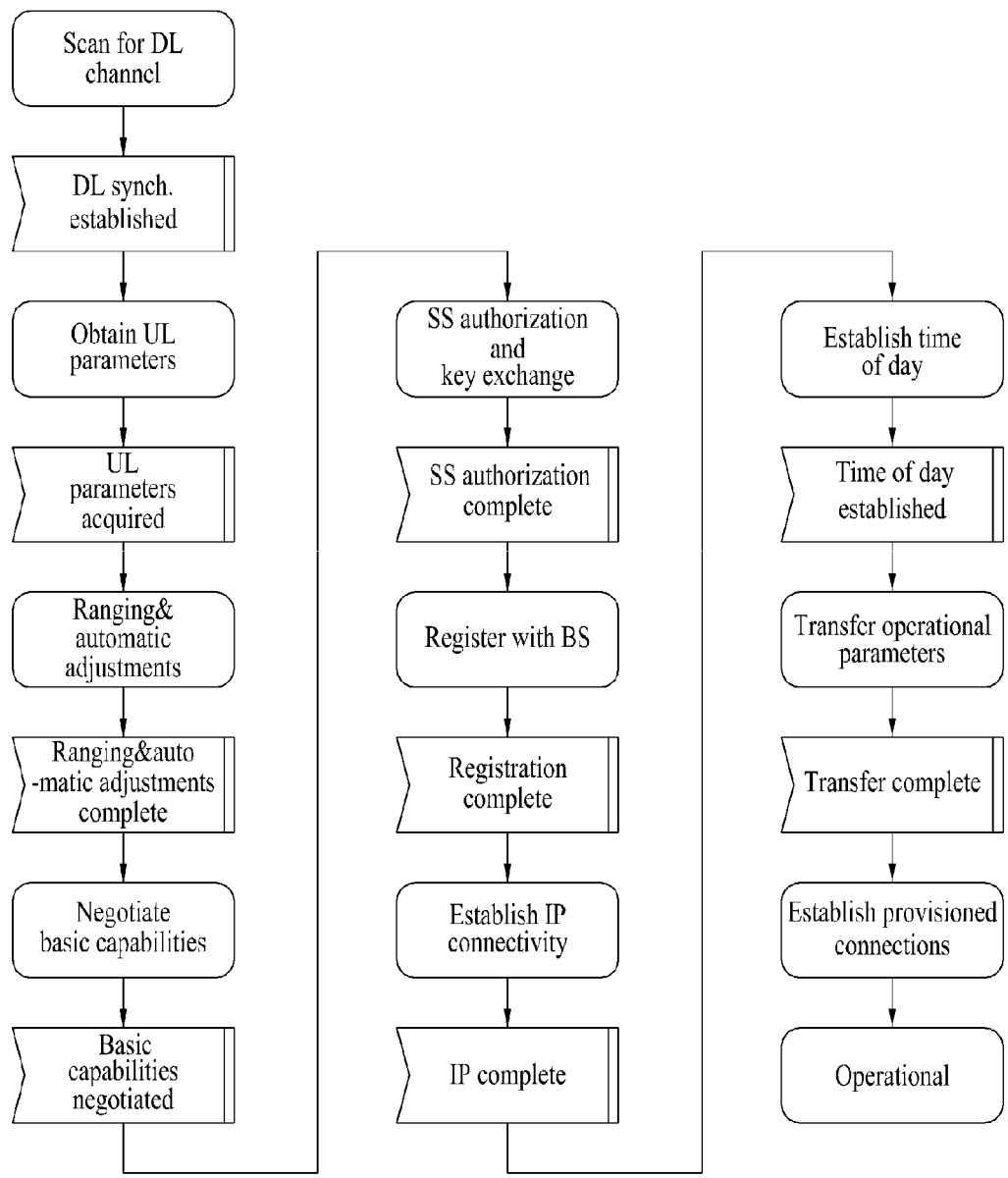
FIG. 2 is a flowchart illustrating an initial access method in the conventional wireless communication system.
Figure 3:
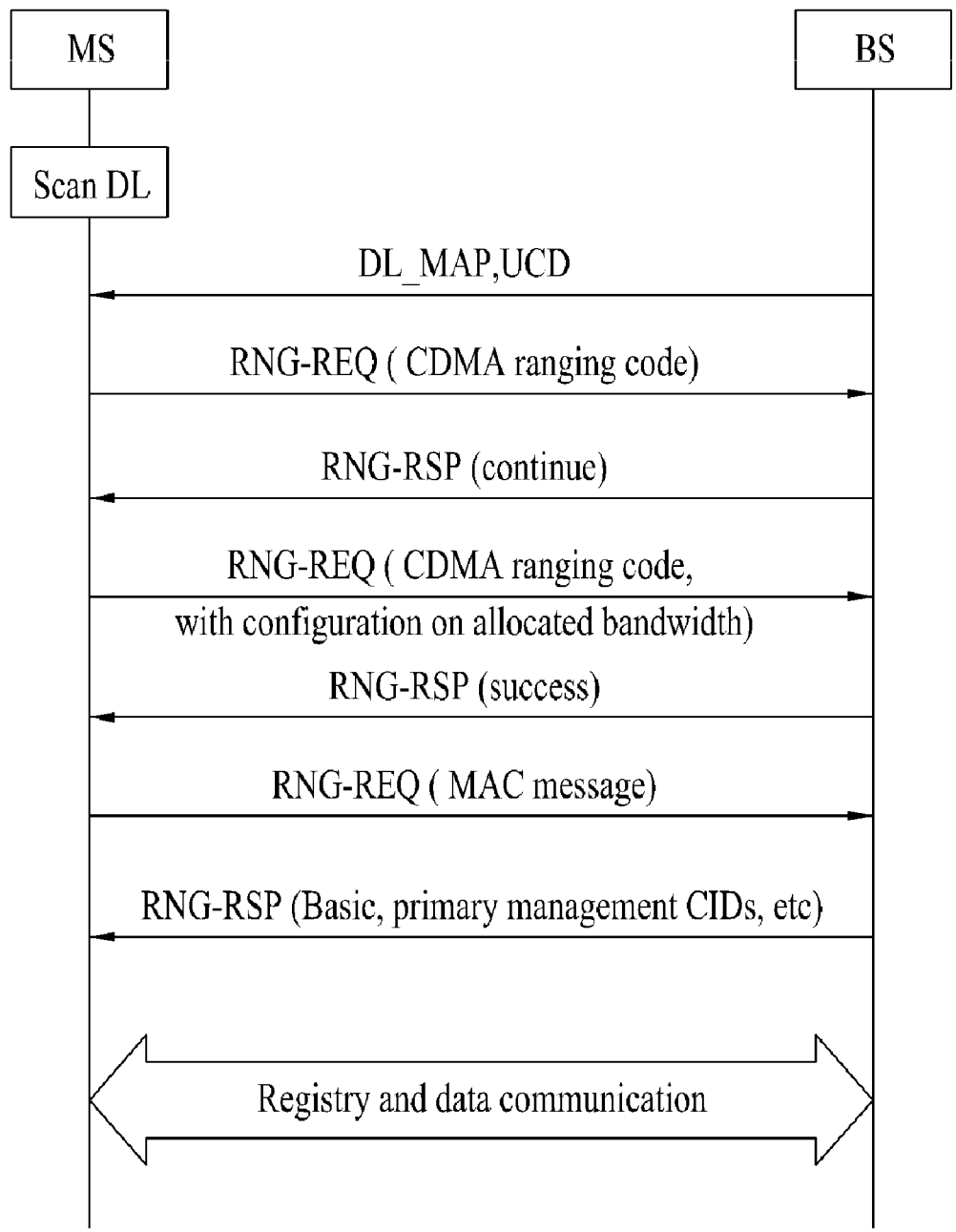
FIG. 3 is a diagram illustrating a signal flow for a ranging procedure between an Advanced Mobile Station (AMS) and an Advanced Base Station (ABS) in the conventional wireless communication system.

The present invention relates to a wireless communication system. Embodiments of the present invention provide a method for efficiently performing an initial access to a Base Station (BS) in a Mobile Station (MS) in a multi-carrier broadband wireless access system.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may ruin the substance of the present invention, are not explained. And, procedures or steps, which can be understood by those skilled in the art, are not explained as well.

Embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminologies used herein may be supported by at least one of IEEE 802.16 standard documents, P802.16-2004, P802.16e-2005, and P802.16Rev2 (P802.16-2009).

Now a detailed description will be made of preferred embodiments of the present invention with reference to the accompanying drawings. The following detailed description presented with reference to the accompanying drawings is intended to describe not the only embodiment of the present invention but exemplary embodiments of the present invention.

Specific terms used for the embodiments of the present invention are provided to help the understanding of the present invention. These specific terms may be replaced with other terms within the scope and spirit of the present invention.

It may occur that an Advanced Mobile Station (AMS) fails in network entry to an Advanced Base Station (ABS). For example, the network entry failure may result when the ABS is in bad load status or has a poor channel quality and thus transmits a rejection to the AMS.

In an IEEE 802.16e system, the ABS transmits the rejection to the AMS usually by a Ranging Response (RNG-RSP) message. As the AMS does not know the rejection until receiving the RNG-RSP message, a ranging procedure that the AMS has performed using a Code Division Multiple Access (CDMA) code is unnecessary, thus causing overhead.

To avert the unnecessary overhead, the AMS determines whether to enter an ABS, using a cell bar bit in the IEEE 802.16m system according to the present invention. Specifically, the AMS may determine whether the ABS will reject the network entry of the AMS due to its load status and thus determine whether to attempt an initial ranging using a CDMA code, based on the cell bar bit determination.

The cell bar is 1 bit, which may be broadcast periodically in a SuperFrame Header (SFH) transmitted by the ABS. If the cell bar bit is set to '0', this means that the ABS is in good load status and thus may accept an additional network entry of an ABS. If the cell bar bit is set to '1', this means that the ABS is in bad load status and thus may not accept an additional network entry of an ABS. In case of an ABS supporting a plurality of carriers, cell bar bits may be set for fully configured carriers respectively among the plurality of carriers.

When a specific ABS to which an AMS attempts a network entry supports a plurality of carriers, the AMS selects one of the carriers and performs the network entry to the ABS on the selected carrier. For example, it is assumed that the ABS supports four carriers, cell bar bits are set to 1s for three of the carriers, and network entry for the AMS is allowed on the other carrier (i.e. a cell bar bit is set to 0 for the other carrier). When the AMS intends an initial access to the ABS on a carrier for which a cell bar bit is set to 1, the network entry may be impossible in view of the load status of the carrier in the ABS. Thus the AMS should select another carrier to thereby attempt a network entry. In other words, the AMS should attempt the network entry until it detects a carrier for which a cell bar bit is set to 0 from among the plurality of carriers supported by the ABS.

In the worst case, the AMS attempts the network entry sequentially on the three carriers for which cell bar bits are set to 1s and the network entry attempts are rejected. Then the AMS succeeds in the network entry on the last carrier for which a cell bar bit is set to 0.

The unnecessary network entry attempts delay the network entry of the AMS, thereby adversely affecting the Quality of Service (QoS) of a service sensitive to an interruption time or delay.

To prevent an unnecessary delay that may be involved in an initial network entry of the AMS in the multi-carrier environment, information about carriers on which the AMS is allowed to perform an initial access to the ABS is transmitted to the AMS on at least one of the plurality of carriers supported by the ABS in accordance with an embodiment of the present invention.

To this end, recommended network entry carrier information is transmitted to the AMS in an SFH of each carrier supported by the ABS.

The recommended network entry carrier information includes information about at least one of recommended carriers that are good in load status and channel quality among the carriers supported by the ABS.

The recommended network entry carrier information may be included only in SFHs of fully configured carriers or SFHs of all carriers. Because at least one recommended carrier indicated by the recommended network entry carrier information is used for an initial access of the AMS, the at least one recommended carrier is preferably a fully configured one, for which a cell bar bit is set to 0.

The recommended network entry carrier information may include the following information.

Index of recommended carrier

Center frequency offset of recommended carrier

Bandwidth of recommended carrier

The statuses of the carriers may vary over time. Hence, the recommended network entry carrier information is preferably updated periodically. That is, it is preferable that information about a best carrier at a current time point is broadcast as recommended network entry carrier information in an SFH.

The recommended network entry carrier information may be included in one of SubPackets (SPs) of a Secondary SFH (S-SFH) as illustrated in Table 1 below.

Table 1 illustrates an example of an S-SFH SP Information Element (IE) according to an embodiment of the present invention.

TABLE 1

| Syntax | Size (bit) | Notes |
|---|---|---|
| S-SFH SPx IE format ( ) { | | May be included in any one of the SP IE's (e.g. SP1, SP2, SP3) |
| ... | | |
| Recommend network entry carrier index | | Physical carrier index of recommended carrier |
| Carrier frequency offset | | Frequency offset of recommended carrier from the current accessing carrier |
| Carrier Bandwidth | | Bandwidth of recommended carrier |
| ... | | |
| } | | |

Referring to Table 1, information about the index, center frequency offset, and bandwidth of a recommended carrier may be included in the S-SFH SP. The S-SFH SP may be any of first, second and third S-SFH SPs, S-SFH SP1, S-SFH SP2, and S-SFH SP3.

The above described recommended network entry carrier information may not included in the SFH of a carrier if the carrier is a fully-configured carrier and is good in load status (i.e., the cell bar bit is set to '0').

Figure 4:
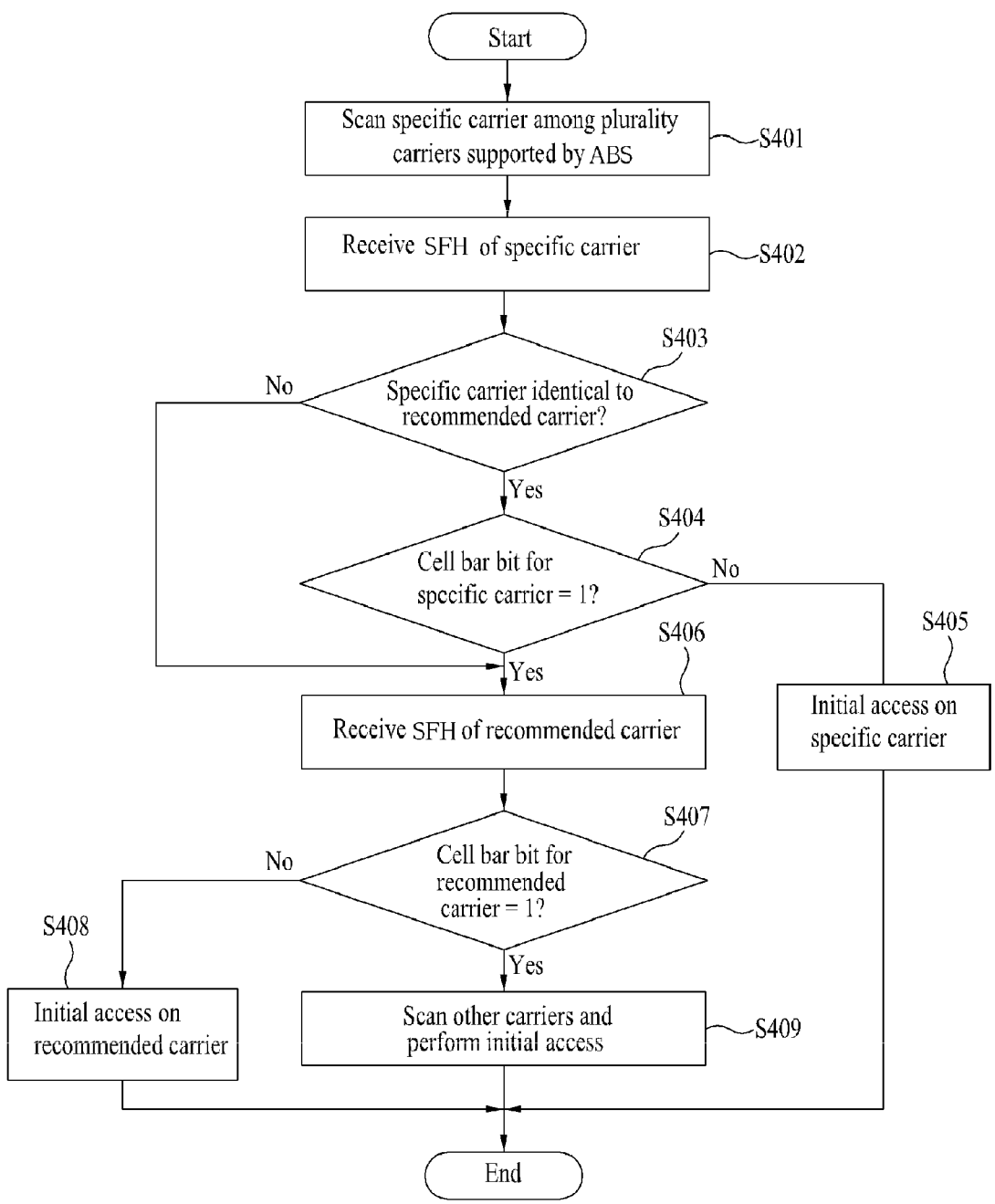
FIG. 4 is a flowchart illustrating an exemplary initial access procedure of an AMS according to an embodiment of the present invention.

With reference to FIG. 4, an initial access method of an AMS in a multi-carrier environment according to an embodiment of the present invention will be described.

FIG. 4 is a flowchart illustrating an exemplary initial access procedure of an AMS according to an embodiment of the present invention.

It is assumed in FIG. 4 that an ABS supports a plurality of carriers, some of which are fully configured and the other carriers of which are partially configured, and recommended network entry carrier information is included in SFHs of both the fully configured carriers and the partially configured carriers.

Referring to FIG. 4, the AMS scans the plurality of carriers supported by the ABS in step S401 and receives an SFH of a specific carrier among the scanned carriers in step S402.

The SFH of the specific carrier may include at least one of a cell bar bit and recommended network entry carrier information.

The AMS may determine from the SFH whether the specific carrier is a fully configured carrier in step S403.

For example, the determination may be made using a field of the SFH, indicating whether the specific carrier is fully configured, or based on the presence or absence of UL control information in the SFH.

If the specific carrier is a fully configured one, the AMS checks a cell bar bit in the SFH in step S404.

If the cell bar bit is set to '0', which means that the specific carrier is in good load status, the AMS may attempt an initial access on the specific carrier in the afore-described initial access method in step S405.

On the contrary, if the cell bar bit is set to '1' in step S404 or if the specific carrier is not fully configured in step S403, the AMS checks recommended network entry carrier information to acquire information about a fully configured carrier in good load status.

As described before with reference to Table 1, the recommended network entry carrier information includes information about the index, center frequency offset and bandwidth of a recommended carrier. Thus, the AMS may scan for the recommended carrier indicated by the recommended network entry carrier information and receive an SFH of the recommended carrier in step S406.

In step S407, the AMS may check a cell bar bit for the recommended carrier in the received SFH because the load status of the recommended carrier indicated by last updated recommended network entry carrier information may be changed at the time when the AMS attempts to access the recommended carrier, according to the update period of the recommended network entry carrier information.

If the cell bar bit is set to '0' for the recommended carrier, which implies that the recommended carrier is in good load status, the AMS may attempt the initial access on the recommended carrier in step S408.

On the contrary, if the cell bar bit is set to '1' for the recommended carrier, the AMS repeats step S406 for a recommended carrier ranked a second best if the recommended network entry carrier information includes information the second-best recommended carrier. Otherwise, the AMS may attempt the initial access sequentially on the other carriers supported by the ABS in the general manner in step S409.

Figure 5:
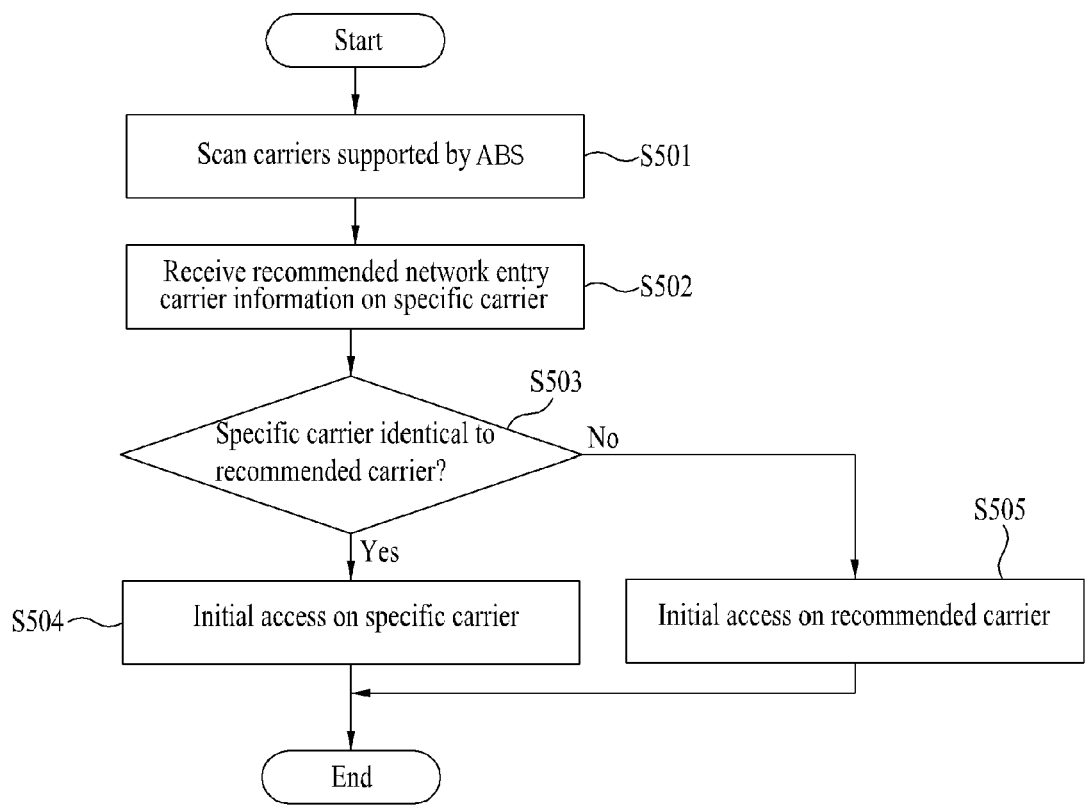
FIG. 5 is a flowchart illustrating another exemplary initial access procedure of an AMS according to the exemplary embodiment of the present invention.

FIG. 5 is a flowchart illustrating another exemplary initial access procedure of an AMS according to the embodiment of the present invention.

It is assumed in FIG. 5 that the AMS receives an SFH of a carrier scanned for an initial access and then does not check a cell bar bit for the carrier.

Referring to FIG. 5, the AMS scans a plurality of carriers supported by an ABS in order to access the ABS in step S501. In step S502, the AMS receives an SFH of a specific carrier among the scanned carriers and checks recommended network entry carrier information in the SFH.

The AMS determines whether the specific carrier is a recommended carrier indicated by the recommended network entry carrier information in step S503.

If the specific carrier is the recommended carrier, which implies that the specific carrier is a fully configured carrier in good load status, the AMS may attempt an initial access on the specific carrier in step S504.

On the other hand, if the specific carrier is not the recommended carrier, the AMS may attempt an initial access on the recommended carrier based on information included in the recommended network entry carrier information in step S505.

A specific application example of the initial access method will be described below with reference to FIG. 6.

Figure 6:
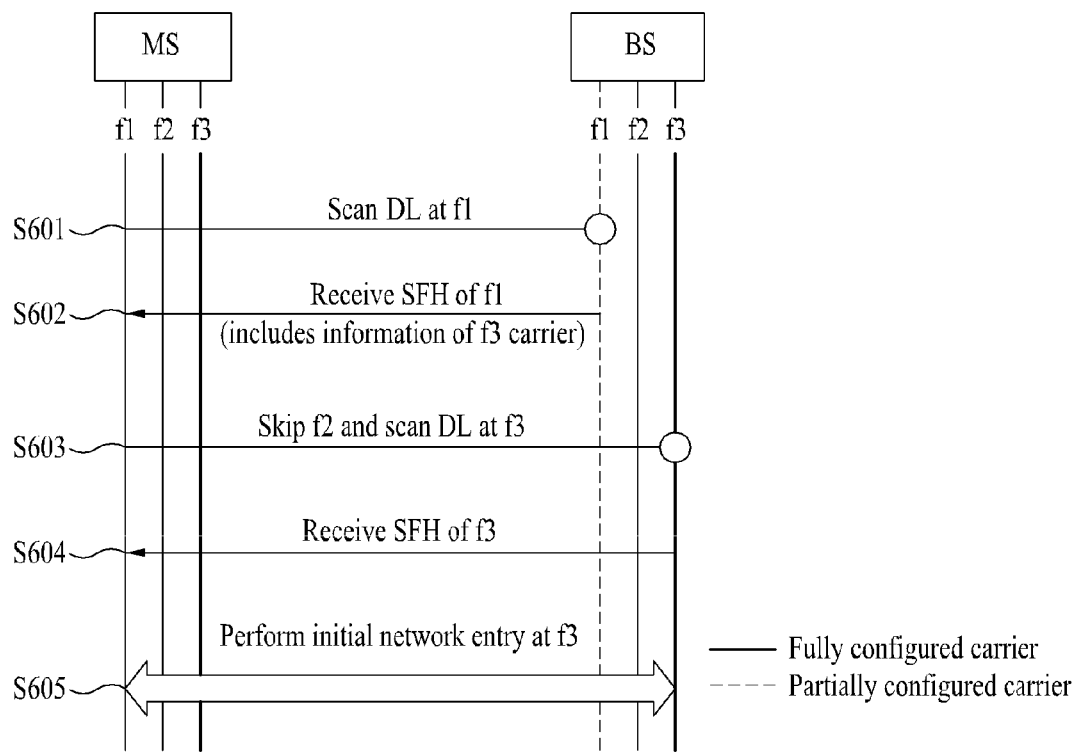
FIG. 6 illustrates a specific application example of an initial access procedure of an AMS according to the embodiment of the present invention.

FIG. 6 illustrates a specific application example of an initial access procedure of an AMS according to the embodiment of the present invention.

It is assumed in FIG. 6 that an ABS supports three carriers, f1, f2 and f3, the first carrier f1 is partially configured, and the second and third carriers f2 and 3 are fully configured. Also, it is assumed that recommended network entry carrier information is included in SFHs of all of the fully and partially configured carriers and the third carrier f3 is in the best load status.

Referring to FIG. 6, the AMS scans the downlink of the first carrier f1 to attempt an initial access to the ABS in step S601 and receives an SFH of the first carrier f1 in step S602.

As assumed, recommended network entry carrier information included in the SFH indicates the third carrier f3 as a recommended carrier.

In general, since the first carrier f1 is not fully configured and thus the initial access is impossible on the first carrier f1, the AMS attempts an initial access on the second carrier f2 according to the order of carrier indexes. However, the AMS scans the third carrier f3 indicated by the recommended network entry carrier information in step S603 and receives an SFH of the third carrier f3 in step S604 in the present invention.

The AMS may check a cell bar bit for the third carrier f3. If the cell bar bit is set to '0', the AMS may attempt an initial access to the ABS on the third carrier f3 in step S605.

An AMS and an ABS (femto BS or macro BS) for implementing the above-described embodiments of the present invention will be described below.

The AMS may serve as a transmitter on a UL and as a receiver on a DL, whereas the ABS may serve as a receiver on the UL and as a transmitter on the DL. Thus the AMS and the ABS each may include a transmitter and a receiver for data transmission and reception.

The transmitter and the receiver each may include a processor, a module, a part and/or means to implement the aforedescribed embodiments of the present invention. Especially the transmitter and the receiver each may include a module (or means) for encrypting a message, a module for interpreting an encrypted message, and an antenna for transmitting and receiving messages. An example of the transmitter and the receiver will be described with reference to FIG. 7.

Figure 7:
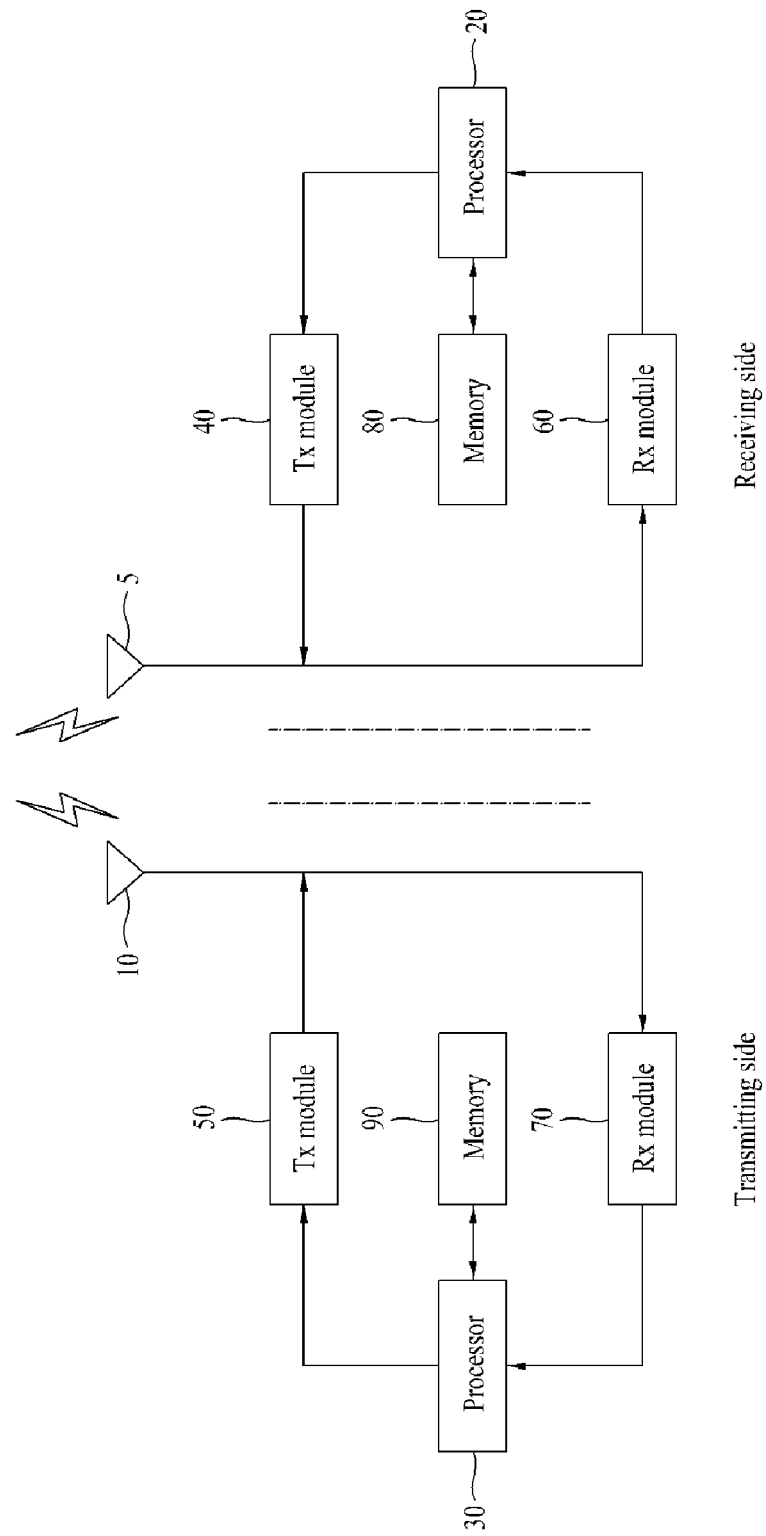
FIG. 7 is a block diagram of a transmitting side and a receiving side according to another embodiment of the present invention.

FIG. 7 is a block diagram of a transmitting side and a receiving side according to another embodiment of the present invention.

Referring to FIG. 7, the transmitting side and the receiving side are shown on the left and right sides, respectively. The transmitting side and the receiving side may include antennas 5 and 10, processors 20 and 30, Transmission (Tx) modules 40 and 50, Reception (Rx) modules 60 and 70, and memories 80 and 90, respectively. The components of the transmitting side are counterparts of the components of the receiving side.

The antennas 5 and 10 transmit signals generated from the Tx modules 40 and 50 over the air, or output external radio signals to the Rx modules 60 and 70. When Multiple Input Multiple Output (MIMO) is supported, two or more antennas may be used.

An antenna, a Tx module, and an Rx module may collectively form a Radio Frequency (RF) module.

The processors 20 and 30 provide overall control to the transmitting side and the receiving side. For example, the processors 20 and 30 may perform a control function according to the embodiments of the present invention, a variable MAC frame control function based on service characteristics and a propagation environment, a handover function, and an authentication and encryption function.

Especially the processor of the AMS provides overall control to the AMS by scanning a plurality of carriers supported by the ABS and receiving an SFH of one of the carriers by controlling the RF module.

For example, the processor of the AMS may receive the SFH of the carrier in synchronization to the carrier by controlling the RF module, decode the SFH, checks a cell bar bit of the carrier in the decoded SFH, and thus identify the load status of the carrier.

In another example, the processor of the AMS may acquire recommended network entry carrier information in a received SFH and acquire information about a recommended carrier in good load status among a plurality of carriers supported by the ABS. The information about the carrier in good load status may include the index, center frequency offset, and bandwidth of the carrier.

The recommended network entry carrier information may be included in an S-SFH SP which may be one of S-SFH SP1, S-SFH SP2 and S-SFH SP3.

The processor of the ABS may set cell bar bits for a plurality of supported carriers and recommended network entry carrier information according to the load statuses of the carriers, and include the cell bar bits and the recommended network entry carrier information in SFHs of the carriers.

The Tx modules 40 and 50 may encode and modulate transmission data scheduled by the processors 20 and 30 in a predetermined modulation and coding scheme and provide the modulated data to the antennas 5 and 10.

The Rx modules 60 and 70 may recover the original data by decoding and modulating RF signals received through the antennas 5 and 10 and thus may provide the original data to the processors 20 and 30.

The memories 80 and 90 may store programs for processing and control operations of the processors 20 and 30 and temporarily store input/output data (sleep mode information according to reference synchronization information). Also, the memories 80 and 90 may include at least one of a flash memory-type storage medium, a hard disc-type storage medium, a multimedia card micro-type storage medium, a card-type memory (e.g. an Secure Digital (SD) or extreme Digital (XS) memory), a Random Access Memory (RAM), a Read-Only Memory (ROM), an Electrically Erasable Programmable Read-Only Memory, a Programmable Read-Only Memory, a magnetic memory, a magnetic disc, and optical disk.

The ABS may perform, in at least one of the above-described modules or in a separately procured means, module or part, a control function according to the embodiments of the present invention, an Orthogonal Frequency Division Multiple Access (OFDMA) packet scheduling, Time Division Duplex (TDD) packet scheduling, channel duplexing, a variable MAC frame control function based on service characteristics and a propagation environment, a real-time high-speed traffic control function, a handover function, an authentication and encryption function, a packet modulation and demodulation function for data transmission and reception, a high-speed packet channel coding function, and a real-time modem control function.

As is apparent from the above description, an AMS (or MS) can efficiently perform an initial access in a multi-carrier environment. Also, the AMS can acquire information about the load statuses of carriers supported by an ABS (or BS).

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an exemplary embodiment of the present invention or included as a new claim by a subsequent amendment after the application is filed.

What is claimed is:

1. A method for efficiently performing an initial access in a Mobile Station (MS) in a multi-carrier broadband wireless access system, the method comprising:
    scanning a plurality of carriers supported by a Base Station (BS);
    selecting one of the scanned plurality of carriers as a first carrier and receiving a SuperFrame Header (SFH) of the first carrier, wherein the SFH includes a field indicating a load status of the first carrier;

determining whether the first carrier is a fully configured carrier; and determining the load status of the first carrier based on the field indicating the load status of the first carrier if the first carrier is a fully configured carrier;

performing the initial access on the first carrier when the field indicating the load status of the first carrier indicates a good load status, and scanning a second carrier when the field indicating the load status field of the first carrier indicates a load status other than a good load status, wherein the second carrier includes a load status field that indicates a good load status of the second carrier, and wherein the SFH of the first carrier further includes recommended network entry carrier information including information about the second carrier.

2. The method according to claim 1, further comprising:
receiving an SFH of the second carrier; and
performing the initial access on the second carrier when the load status field of the first carrier indicates a load status other than good.

3. The method according to claim 1, wherein the load status field of the first carrier is a cell bar bit field.

4. The method according to claim 1, wherein the recommended network entry carrier information is included as a secondary SFH subpacket information element in the SFH and includes information about at least an index, a center frequency offset, or a bandwidth of the second carrier.

5. The method according to claim 1, wherein the recommended network entry carrier information is updated at a predetermined interval.

6. A Mobile Station (MS) in a multi-carrier broadband wireless access system, the MS comprising:
a Radio Frequency (RF) module; and
a processor configured to:
scan a plurality of carriers supported by a Base Station (BS);
select one of the scanned plurality of carriers as a first carrier and control the RF module to receive a Super-Frame Header (SFH) of the first carrier wherein the SFH includes a field indicating a load status of the first carrier,
determine whether the first carrier is a fully configured carrier;
determine the load status of the first carrier based on the field indicating the load status of the first carrier if the first carrier is a fully configured carrier;
perform the initial access on the first carrier when the field indicating the load status of the first carrier indicates a good load status, and
scan a second carrier when the field indicating the load status field of the first carrier indicates a load status other than a good load status, wherein the second carrier includes a load status field that indicates a good load status of the second carrier, and
wherein the SFH of the first carrier further includes recommended network entry carrier information including information about the second carrier.

7. The MS according to claim 6, wherein the processor is further configured to:
control the RF module to receive an SFH of the second carrier; and
perform the initial access on the second carrier when the load status field of the first carrier indicates a load status other than good.

8. The MS according to claim 6, wherein the load status field of the first carrier is a cell bar bit field.

9. The MS according to claim 6, wherein the recommended network entry carrier information is included as a secondary SFH subpacket information element in the SFH and includes information about at least an index, a center frequency offset, or bandwidth of the recommended carrier.

* * * * *